United States Patent [19]

Jones et al.

[11] Patent Number: 4,739,779
[45] Date of Patent: Apr. 26, 1988

[54] APPARATUS FOR WASHING AN ARTICLE

[75] Inventors: Jack D. Jones, Lima, Ohio; Russell K. Glover, Tequesta, Fla.

[73] Assignee: Aircraft Dynamics Corporation, Elida, Ohio

[21] Appl. No.: 428,095

[22] Filed: Sep. 29, 1982

Related U.S. Application Data

[63] Continuation-in-part of Ser. No. 264,863, May 18, 1981, Pat. No. 4,369,801.

[51] Int. Cl.⁴ .................................................. B60S 3/04
[52] U.S. Cl. .................................. 134/45; 134/58 R; 134/123
[58] Field of Search .................. 134/45, 56–58 R, 134/94, 123; 239/135, 186

[56] References Cited

U.S. PATENT DOCUMENTS

| Re. 23,294 | 11/1950 | Hopper et al. | 134/94 |
| 1,861,154 | 5/1932 | Dorman | 138/31 |
| 2,699,792 | 11/1955 | Fisher | 134/56 |
| 2,732,846 | 1/1956 | Berenzy | 134/45 |
| 2,751,915 | 6/1956 | Roberts | 134/123 |
| 3,017,122 | 1/1962 | Malsbary | 239/135 |
| 3,079,935 | 3/1963 | Padek | 134/45 |
| 3,175,564 | 3/1965 | Baird, Jr. et al. | 134/123 X |
| 3,391,700 | 7/1968 | Lawter | 134/45 |
| 3,409,030 | 11/1968 | Schmidt | 134/123 |
| 3,464,631 | 9/1969 | Lieffring et al. | 134/123 X |
| 3,573,862 | 4/1971 | Brown | 134/123 X |
| 3,651,830 | 3/1972 | Kollmai | 134/45 X |
| 3,844,480 | 10/1974 | Taylor | 239/186 |
| 3,854,054 | 12/1974 | Conn, Jr. | 134/45 X |
| 4,369,801 | 1/1983 | Jones et al. | 134/58 R |

FOREIGN PATENT DOCUMENTS

| 512466 | 7/1952 | Belgium | 134/123 |
| 1479723 | 7/1977 | United Kingdom | 134/123 |

Primary Examiner—Stephen Marcus
Attorney, Agent, or Firm—Sidney W. Millard

[57] ABSTRACT

Apparatus for washing an article, especially an automobile, comprises an article through which the article can pass, nozzles mounted on the framework, a tank provided with means for maintaining pressure therein and connected to the nozzles, a valve for controlling the flow of liquid from the tank to the nozzles and a timer. Upon actuation, the timer opens the valve for a predetermined interval, thereby allowing liquid to flow from the nozzles and wash the article passing through the framework. The pressure within the tank ensures that at least a predetermined quantity of liquid is sprayed during the interval fixed by the timer, even if the pressure in a water main supplying the apparatus fluctuates.

3 Claims, 3 Drawing Sheets

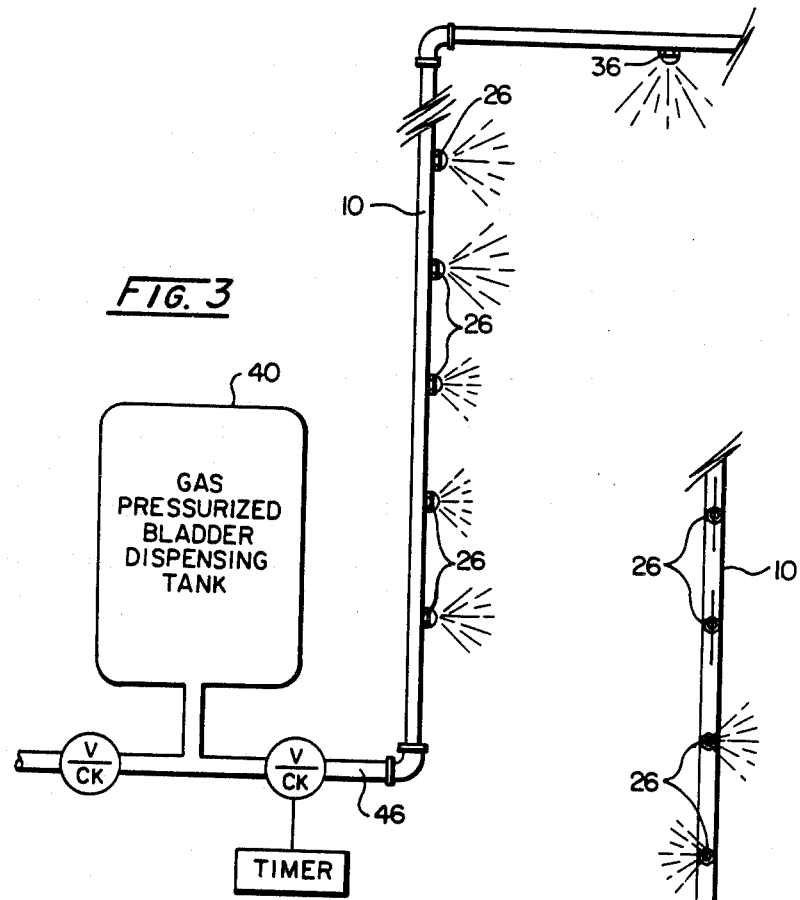
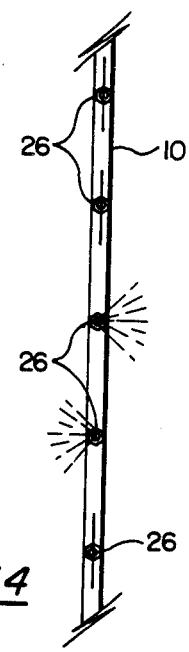
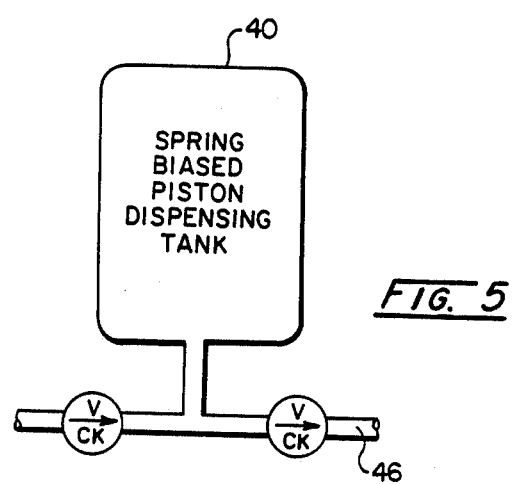

4,739,779

APPARATUS FOR WASHING AN ARTICLE

This application is a continuation-in-part of application Ser. No. 264,863, filed May 18, 1981, now U.S. Pat. No. 4,369,801.

FIELD OF THE INVENTION

The invention relates to apparatus for washing an article. The apparatus is especially intended for the washing of automobiles and other vehicles.

BACKGROUND OF THE INVENTION

Numerous types of apparatus for washing automobiles are known. However, hitherto such automobile-washing apparatus has generally been very bulky and expensive and has required at least one attendant to operate the apparatus. For example, most commercial car-washes use a large amount of equipment located within a permanent building and automobiles are carried through the washing equipment by a carriage which engages their rear wheels. Other types of washing apparatus are known which are mounted upon moveable carriages so that the washing apparatus can be moved past an automobile, the automobile remaining stationary. With such apparatus, an operator is necessary to move the washing apparatus past the stationary automobile.

The weight and size of conventional vehicle-washing apparatus means that the apparatus cannot readily be moved from place to place. Furthermore, such apparatus is affected by fluctuations in the pressure of the water mains used to supply water to the apparatus, unless the apparatus includes pumps to maintain the water pressure despite fluctuations in pressure.

The invention provides an apparatus for washing articles, especially vehicles, which is simple in construction and can be made readily transportable from place to place. Furthermore, the apparatus can be made automatic so that it does not require an attendant, and the apparatus is not affected by fluctuations in water pressure.

SUMMARY OF THE INVENTION

The instant apparatus comprises a framework through which the article to be washed can pass. A plurality of spray nozzles are mounted on the framework to form two sets of nozzles and each set is directed so as to spray liquid onto an article passing through the framework. A pair of tanks are provided for holding washing liquid, together with conduits for supplying liquid from the tanks to the nozzles. A valve in each conduit controls the flow of liquid along the conduit from the feeder tank to the nozzles. A timer is provided for sequentially opening the valves at the beginning of a predetermined interval, thereby allowing washing liquid to pass from each feeder tank to one of the sets of nozzles, and for closing the valve at the end of this predetermined interval, the operation of the timer being commenced by means of an acutator. Means are provided for pressurizing the liquid in the tanks, thereby ensuring that at least a predetermined amount of liquid flows from the tanks to the nozzles during the interval determined by the timer. This pressurizing means preferably has the form of either a gas-pressurized bladder disposed within the tank or a spring-biased piston disposed within the tank.

A pair of inverted U-shaped assemblies mounted for spraying the surface of a vehicle during its sequential passage under the framework allows one kind of wash liquid to be sprayed from the first assembly and a modified liquid to be sprayed from the second assembly. In one desired embodiment the second assembly will spray deionized water with most of the "hard water" minerals removed to prevent "water spots" from forming on the vehicle.

Because there is a mineral content in most municipal water systems and there is no drying process inherent in this invention except the ambient air, spots will form on the vehicle surface when the water dries. To prevent the formation of the water spots, water with greatly reduced mineral content is sprayed from the nozzles of the second U-shaped assembly.

The timer is programmed to begin pumping water through the first set of nozzles a predetermined time before it starts the water flow through the second set of nozzles. The obvious reason is to minimize the use of treated water in the second set of nozzles. The vehicle driver will pull slowly through the first set of nozzles and may not pull his vehicle into the second spray pattern until it begins to spray. Therefore, the timing sequence and the spacing between the two sets of nozzles must be coordinated. For example, if the second set of nozzles is only one-half a car length from the first set, the second set should begin to spray about ten seconds after the first set begins. On the other hand, if the second set is one and one-half car lengths removed, the time delay should be about thirty seconds. The duration of spray from each set of nozzles should be no longer than about twenty seconds.

The U-shaped frames could be adjacent one another if desired, and the driver could pull slowly through the first spray sequence and then after a short interval, the driver could back through the framework when the de-ionized liquid spray began.

BRIEF DESCRIPTION OF THE DRAWINGS

FIG. 3 is a fragmentary schematic view of the valving, tank and spray combination;

FIG. 4 is a fragmentary view of the conduit and nozzle combination illustrating a spray sequence; and FIG. 5 is an alternative embodiment to the structure of FIG. 3.

DETAILED DESCRIPTION OF THE DRAWINGS

Figure 1:
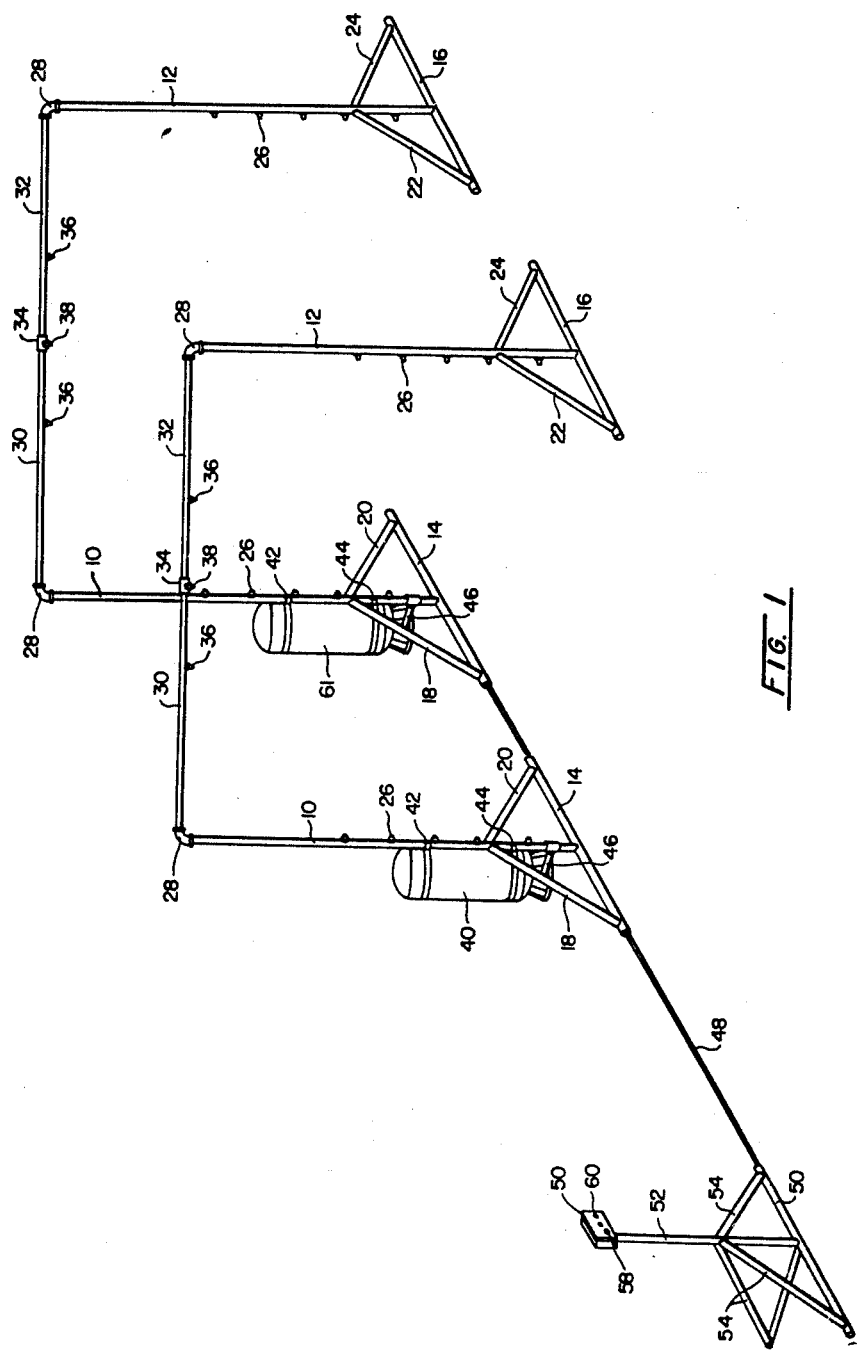
FIG. 1 is a perspective view of a washing apparatus of the invention.

The washing apparatus shown in FIG. 1 includes a pair of identical U-shaped frames on which spray nozzles are mounted. For convenience, only the first will be described. Each frame comprises two vertical tubular members 10 and 12 supported on tubular bases 14 and 16 respectively. The member 10 is braced by bracing members 18 and 20, while the member 12 is braced by bracing members 22 and 24. Each of the vertical members 10 and 12 carries five nozzles 26.

The vertical members 10 and 12 are joined by means of elbows 28 to a horizontal member extending between the upper ends of the vertical members 10 and 12. This horizontal member is in two sections 30 and 32 held together by a sleeve 34. Each of the members 30 and 32 carries a single downwardly directed nozzle 36, while the sleeve 34 carries an additional downwardly directed nozzle 38. It will be seen that the members 10, 12, 30 and 32 all lie substantially in a single plane. All these members are formed of hollow metal or plastic tubes, the hollow interiors of the members communicating with the outlets of the nozzles 26, 36 and 38. The members 10, 12, 28, 30, 32 and 34 are all provided with mating screw threads so that they can be fitted together in a water-tight manner but can be readily disassembled for transportation.

A tank 40 is clamped to the vertical member 10 by means of ring clamps 42 and 44. A conduit 46 extends from adjacent the base of the tank 40 and communicates with the hollow interior of the vertical member 10. An electrically-operated valve (not shown) is provided within the conduit 46. Although not shown in FIG. 1, the upper part of the tank 40 is occupied by a gas-pressurized bladder, and a valve (also not shown) is provided to enable the gas pressure within this bladder to be adjusted from outside the tank 40. The tank is also provided with a water inlet conduit (not shown) connected to a water main in order to supply water to the tank 40, a check valve being provided in this inlet conduit to allow water to flow from the water main to the tank but not in the reverse direction. Alternatively the tank 40 may be connected to a source of detergent solution under pressure.

From the base 14, a tube 48 extends to a T-shaped base 50. A column 52 extends upwardly from the base 50 and is braced by three bracing members 54 extending to the extremities of the base 40. A control and indicator panel including a coin-operated switch 58 and indicators 60 is mounted atop the column 52.

The second U-shaped framework shows a second tank 61 mounted identically with tank 40 on the first framework and it is merely illustrative. The tank 61 serves both to receive deionized or demineralized water from a deionizer tank(s) (not shown) and put it under the required pressure in the same fashion as tank 40. The technology of water de-ionization is well known and a description appears unnecessary.

The timing sequence between the beginning of spray from the first set of nozzles to the beginning of spray from the second set of nozzles depends upon the relative locations of the frames. The timing may be set by the timing mechanism described subsequently as it relates to the time from the coin-operated switch 58 to the beginning of the first set of spray nozzles. The beginning of spray by the second set of nozzles is controlled in a similar fashion and no additional description appears necessary. The circuitry to accomplish the first time delay is described subsequently.

Figure 2:
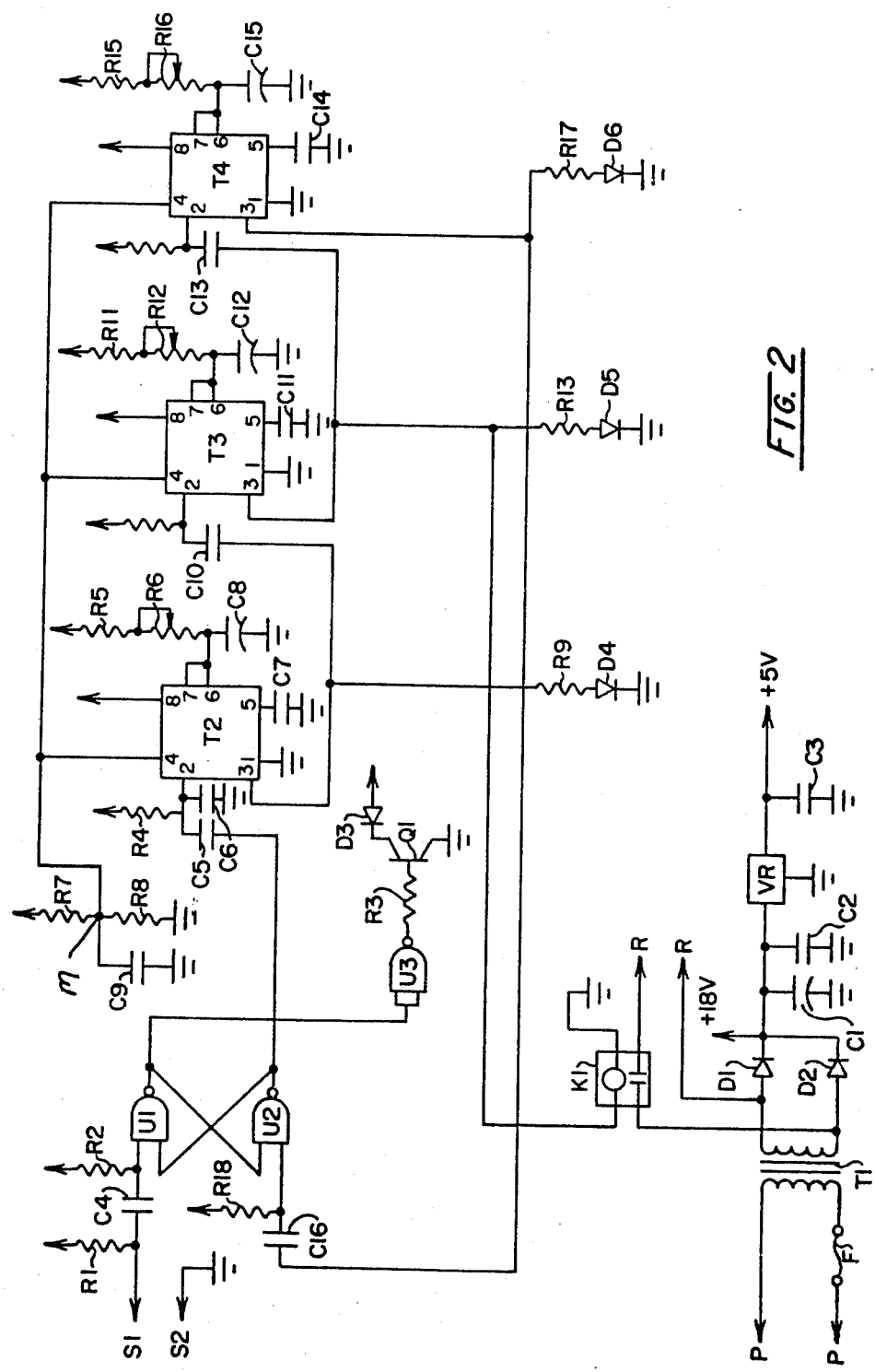
FIG. 2 is a circuit diagram of the electronic circuitry used in the washing apparatus shown in FIG. 1.

In FIG. 2 is shown the circuitry used in the apparatus shown in FIG. 1. Except as noted below, all this circuitry is accommodated within the control panel; the circuitry for the time delay between the first and second framework is not illustrated at all as its description would be redundant.

Leads P—P in FIG. 2 are connected to a conventional 115 V 60 Hz mains supply. The leads P—P supply the primary coil of a transformer T1, a fuse F being incorporated in one of the leads to prevent excessive current. The secondary coil of transformer T1 is arranged in a full-wave center-tapped configuration with diodes D1 and D2. The DC output from D1 and D2 is supplied to one plate of smoothing capacitors C1 and C2, the other plates of which are grounded, and also to the input of a three-terminal voltage regulator VR. This voltage regulator is conveniently a Fairchild model MC 7805, manufactured by Fairchild Camera and Instrument Corporation, 464 Ellis Street, Mountview, CA 94042. The five-volt DC output from voltage regulator VR is passed over a capacitor C3 to the positive supply line.

Between the secondary coil of transformer of T1 and the diodes D1 and D2 an 18 volt AC supply is tapped and fed via a solid state relay K1 to leads R—R.

The coin-operated switch 58 shown in FIG. 1 is a single pull, single throw normally open switch of conventional type and is connected between leads S1 and S2 in FIG. 2. Lead S2 is grounded, while lead S1 is connected via a resistor R1 to the positive supply line and is also connected to one plate of a capacitor C4. The other plate of capacitor C4 is connected via a resistor R2 to the positive supply line and is also connected to one input of a NAND gate U1. The NAND gate U1 is interconnected with a similar NAND gate U2 to form a flip-flop. The output of gate U1 is connected to both inputs of a further NAND gate U3, the output of which is connected via a resistor R3 to the base of an NPN transistor Q1. The emitter of Q1 is grounded, while the collector of Q1 is connected via an LED D3 to the positive supply line.

The output of NAND gate U2 is fed to one plate of the capacitor C5, the other plate of which is connected to the positive supply line by a resistor R4 and also connected to pin 2 of a timer T2. A small capacitor C6 is connected between pin 2 of timer T2 and ground. The timerT2 is a commercially available Signetics NE 555 timer manufactured by Signetics Corporation. Pin 8 of timer T2 is connected to the positive supply line, pin 1 is connected directly to ground and pin 2 is connected to ground via a capacitor C7. Pins 6 and 7 of timer T2 are connected to an RC circuit comprising a fixed resistor R5, a variable resistor R6 and a capacitor C8. Pins 6 and 7 of timer T2 are connected between the resistor R6 and the capacitor C8. Pin 4 of the timer T2 is connected to the mid-point M of a voltage divider comprising resistors R7 and R8 connected in series between the positive supply line and ground. A capacitor C8 is also connected between the mid-point M and ground.

The output of timer T2 on pin 3 is fed to via a resistor R9 to an LED D4, the opposed side of which is grounded. The output from pin 3 of timer T2 is also fed to one plate of capacitor C10, the opposed plate of which is connected to the positive supply line via a resistor R10 and to pin 2 of timer T3. Timer T3 is of exactly the same type as timer T2 and is connected to exactly corresponding circuitry, pin 8 of timer T3 being connected to the positive supply line, pin 1 directly to ground, pin 5 via a capacitor C11 to ground and pins 6 and 7 being connected to an RC circuit comprising a fixed resistor R11, a variable resistor R12 and a capacitor C12. Pin 4 of timer T3 is connected to the mid-point M of the voltage divider formed by resistors R7 and R8. The output from pin 3 of timer T3 is fed to the solid state relay K1 and also via a resistor R13 to an LED D5, the opposed side of which is grounded, and to one plate of a capacitor C13. The other plate of capacitor C13 is connected to the positive supply line via a resistor R14 and is also connected to pin 2 of a timer T4. Timer T4 is of the same type as timers T2 and T3 and is connected to substantially similar circuitry, pin 8 of timer T4 being connected to the positive supply line, pin 1 being grounded directly, pin 5 being grounded by a capacitor C14 and pins 6 and 7 being connected to an RC circuit comprising a fixed resistor R15, a variable resistor R16 and a capacitor C15. Pin 4 of timer T4 is connected to the mid-point M of the voltage divider formed by resistors R7 and R8. The output of timer T4 on pin 3 is fed via a resistor R17 to an LED D6, the opposed side of which is grounded, and to one plate of a capacitor C16. The opposed side of capacitor C16 is connected to the positive supply line via a resistor R18 and also to the second input of NAND gate U2. The LED's D3, D4, D5 and D6 comprise the indicators 60 in FIG. 1.

The apparatus shown in FIGS. 1 and 2 operates as follows. When the apparatus is not being used, the output of U1 is high, so that the output of U3 (which acts as an invertor) is low, the transistor Q1 does not conduct and the LED D3 is extinguished. The output of U2 is low, as are the outputs of the timers T2, T3 and T4, so that the LED's D4, D5 and D6 are also extinguished and the relay K1 is not energized.

An automobile driver wishing to use the apparatus drives up to the column 52, opens his window, inserts the appropriate coin(s) or a plastic card into the coin-operated switch 58 and closes his window. The insertion of the coin(s) into the switch 58 causes the switch to close, thereby interconnecting lines S1 and S2 in FIG. 2 and discharging capacitor C4. The discharge of capacitor C4 causes the flip-flop formed by U1 and U2 to change state, so that the output of U1 goes low, the output of U3 goes high and the transistor Q1 becomes conducting. This causes the LED D3 to conduct, thereby indicating that the apparatus is in use.

The change of state of the flip-flop also causes the output of U2 to go high, thereby causing capacitor C5 to charge through resistor R4 and triggering the operation of timer T2. The capacitor C6 prevents too abrupt a change in potential at pin 2 of timer T2 and thus ensures proper operation of timer T2. The predetermined interval timed by timer T2 may be varied by adjusting variable resistor R6. As timer T2 begins the timing of its predetermined interval, its output on pin 3 goes high, thereby lighting LED D4, which acts as a "drive up" light instructing the driver to drive his automobile up to the framework formed by members 10, 12, 28, 30, 32 and 34. When timer T2 ends the timing of its predetermined interval, the output on pin 3 goes low, thereby extinguishing LED D4 and causing capacitor C10 to charge through R10, thus triggering the operation of timer T3.

The length of the predetermined interval timed by timer T3 may be adjusted by varying the resistor R12. When the timer T3 is triggered, its output on pin 3 goes high, thereby lighting LED D5 and indicating that the wash part of the operating cycle has commenced. The high output from T3 also energizes solid state relay K1, thereby supplying power to and opening the electrically-operated valve connected across leads R—R in FIG. 2 and located within the conduit 46 (FIG. 1). The opening of this valve permits liquid to flow from the tank 40 through the conduit 46 into the vertical member 10, the horizontal members 30 and 32 and the vertical member 12 and out of the nozzles 26, 36 and 38. The nozzles thus form a curtain of liquid through which the driver drives the automobile. The gas bladder within the tank 40 maintains pressure on the liquid within the tank so ensuring that at least a predetermined quantity of liquid is discharged from the tank during the predetermined interval fixed by the timer T3.

When timer T3 reaches the end of its predetermined interval, the output from pin 3 thereof goes low, thereby extinguishing LED D5, de-energizing relay K1 and closing the valve in the conduit 46. Thus, the spraying of water from the nozzles is ended. Also, when the output from timer T3 goes low, capacitor C13 is charged through resistor R14, thereby initiating timer T4.

The predetermined interval timed by timer T4 can be varied by adjusting resistor R16. At the beginning of its predetermined interval, the output from pin 3 of timer T4 goes high, thereby lighting LED D6 to indicate that the apparatus is in the fill portion of its cycle and no attempt should be made to commence a new cycle by inserting further coins into the coin-operated switch 58 (note that the "busy" light, LED D3 is still lit). During the predetermined interval set by time T4, the tank 40 is refilled from the water mains via the conduit leading to the tank. The value of variable resistor R16 is set by the installer when the apparatus is installed at a particular location, the value of R16 being varied in accordance with the mains pressure at that location in order to insure that the predetermined interval set by timer T4 will be sufficient to allow an adequate volume of water to be received into tank 40 during the interval set by timer T4.

When timer T4 goes low at the end of its predetermined interval, the LED D6 is extinguished and capacitor C16 is charged via resistor R18. This causes the output from U2 to go low, thereby causing the output from U1 to go high and extinguishing the LED D3. The apparatus is now ready to commence another cycle.

It will thus be seen that the operation of the apparatus shown in the drawings, once installed, is completely automatic, being controlled solely by the insertion of coins into the coin-operated switch 58 and requiring no attendant, the customer simply driving his automobile through the framework formed by the members 10, 12, 30 and 32 as water is sprayed from the nozzles. Desirably, at least one of the nozzles 26 on vertical member 10 is directed out of the plane of the framework in one direction (say towards the column 52) at an acute angle to the plane of the framework. Similarly, it is desirable that at least one of the nozzles 26 on the vertical member 12 be directed out of the plane of the framework in the opposed direction (i.e. away from the column 52) at an acute angle to the plane of the framework. With this arrangement, as the customer drives his automobile through the framework, the angled nozzles on the member 12 will sweep across the front of the automobile, while after the automobile has passed through the framework the angled nozzles on the vertical member 12 will sweep across the rear surface of the automobile, thereby ensuring that the whole surface of the automobile (other than the underside) will be washed. If desired, the apparatus may be modified by providing a further horizontal member interconnecting the lower ends of the vertical members 10 and 12 and provided with nozzles arranged to wash the under side of an automobile passing through the framework, ramps desirably being provided on each side of the lower horizontal member to prevent damage thereto as automobiles pass thereover.

The apparatus shown in FIGS. 1 and 2 is compact, easily transported and easily assembled and disassembled. Furthermore, because of the pressurization of the tank 40 by the bladder contained therein, the apparatus is not affected by momentary fluctuations in water mains pressure. It will be appreciated that other means of pressurizing the tank 40, such as a spring-biased piston within the tank, may be substituted for the pressurized bladder.

The apparatus just described may be modified to incorporate means for adding detergent or other additives to the water sprayed from the nozzles. However, in many applications the apparatus may be used with pure water. For example, the apparatus may be used to rinse salt from automobiles which have been parked close to a body of salt water, thereby preventing the corrosion induced by wind-borne salt. The salt may be completely removed by pure water, no detergents being necessary.

Although the instant apparatus has been described above with reference to its application in washing automobiles and other vehicles, it will be appreciated that the apparatus may be used to wash or apply liquid to any article passing through the framework. Thus, for example, the apparatus could be employed to rinse articles being carried along a production line, the framework of the apparatus being arranged to straddle the conveyor carrying the articles.

In as much as numerous changes and modifications may be made in the apparatus described above, the foregoing description is to be interpreted in an illustrative and not in a limited sense, the scope of the invention being defined solely by the amended claims.

We claim:

1. Apparatus for washing an article comprising:
   a first framework through which the article can pass;
   a plurality of spray nozzles mounted on said framework and directed so as to spray a first liquid on to the article passing therethrough;
   a first tank for holding liquid;
   a first conduit for supplying liquid from said tank to said nozzles;
   a first valve means for controlling the flow of liquid along said conduit from said tank to said nozzles;
   a timer means for (1) opening said valve means at the beginning of a predetermined interval, thereby allowing said liquid to pass from said tank to said nozzles, and (2) closing said valve means at the end of said predetermined interval;
   means for actuating said timer means, thereby beginning said interval;
   means for pressurizing said liquid in said tank and thereby ensuring that at least a predetermined amount of liquid flows from said tank to said nozzles during said interval;
   a second framework with an associated second tank, a second conduit, spray nozzles and valve means arranged to spray a second liquid on the article following the first spray;
   said actuating means comprises a switch and a second timer means, said second timer means actuating the operation of said first timer a predetermined second interval after said switch has been operated;
   said first tank being provided with a first liquid inlet conduit connectable to a liquid supply and a check valve being disposed in said first liquid inlet conduit, said check valve permitting flow into but not out of said first tank along said first liquid inlet conduit;
   said pressurizing means comprises a gas-pressurized bladder disposed within said first tank;
   said first and second framework both comprise two spaced, substantially vertical members and a substantially horizontal member interconnecting the upper ends of said vertical members, said vertical and horizontal members lying in a single plane; and
   at least one of said nozzles on each of said vertical members is stationary and arranged to spray liquid out of said plane in one constant direction, at least one other of said nozzles on each of said vertical members is stationary and arranged to spray out of said plane in the opposed constant direction and a plurality of said nozzles on each vertical member sprays water in a constant direction including said plane.

2. Apparatus for washing an article comprising:
   a first framework through which the article can pass;
   a plurality of spray nozzles mounted on said framework and directed so as to spray a first liquid on to the article passing therethrough;
   a first tank for holding liquid;
   a first conduit for supplying liquid from said tank to said nozzles;
   a first valve means for controlling the flow of liquid along said conduit from said tank to said nozzles;
   a timer means for (1) opening said valve means at the beginning of a predetermined interval, thereby allowing said liquid to pass from said tank to said nozzles, and (2) closing said valve means at the end of said predetermined interval;
   means for actuaing said timer means, thereby beginning said interval;
   means for pressurizing said liquid in said tank and thereby ensuring that at least a predetermined amount of liquid flows from said tank to said nozzles during said interval;
   a second framework with an associated second tank, a second conduit, spray nozzles and valve means arranged to spray a second liquid on the article following the first spray;
   said actuating means comprises a switch and a second timer means, said second timer means actuating the operation of said first timer a predetermined second interval after said switch has been operated;
   said first tank being provided with a first liquid inlet conduit connectable to a liquid supply and a check valve being disposed in said first liquid inlet conduit, said check valve permitting flow into but not out of said first tank along said first liquid inlet conduit;
   said pressurizing means comprises a spring biased piston disposed within said first tank;
   said first and second framework both comprise two spaced, substantially vertical members and a substantially horizontal member interconnecting the upper ends of said vertical members, said vertical and horizontal members lying in a single plane; and
   at least one of said nozzles on each of said vertical members is stationary and arranged to spray liquid out of said plane in one constant direction, at least one other of said nozzles on each of said vertical members is stationary and arranged to spray out of said plane in the opposed constant direction and a plurality of said nozzles on each vertical member sprays water in a constant direction including said plane.

3. Apparatus according to claim 1 or 2 wherein the second liquid is in deionized condition.

* * * * *